United States Patent [19]

Gleason

[11] E Re. 28,896

[45] Reissued July 13, 1976

[54] CUTTING TOOL ASSEMBLY

[75] Inventor: Patrick J. Gleason, Lum, Mich.

[73] Assignee: Lumco Manufacturing Company, Lum, Mich.

[22] Filed: June 13, 1974

[21] Appl. No.: 478,912

Related U.S. Patent Documents

Reissue of:

[64] Patent No.: 3,760,425
Issued: Sept. 25, 1973
Appl. No.: 280,600
Filed: Aug. 14, 1972

[52] U.S. Cl. ..... 29/97; 82/36 R
[51] Int. Cl.[2] ..... B26D 1/00
[58] Field of Search ..... 29/97, 96; 82/36, 37

[56] References Cited

UNITED STATES PATENTS

| | | | |
|---|---|---|---|
| 1,011,144 | 12/1911 | Baker | 29/97 |
| 3,136,031 | 6/1964 | Cassidy | 29/97 |
| 3,180,006 | 4/1965 | Emmons | 29/97 |
| 3,316,617 | 5/1967 | Stein | 29/97 |
| 3,436,800 | 4/1969 | Cashman et al. | 29/97 |

FOREIGN PATENTS OR APPLICATIONS

| | | | |
|---|---|---|---|
| 1,174,100 | 12/1969 | United Kingdom | 82/36 R |

*Primary Examiner*—Leonidas Vlachos
*Attorney, Agent, or Firm*—Barnes, Kisselle, Raisch & Choate

[57] ABSTRACT

A cutting tool assembly comprising a cutter body which mounts at each of its opposite sides on one end and at the proper cutting angles a relatively narrow rectangular shaped cutter blade and a triangular shaped cutter blade. These cutter blades are maintained in an operative position in engagement with each other by a clamping element that is releasably joined to the cutter body at an angle that is related to the cutter cutting angles. Support and locking provisions further facilitate maintaining this operative position. Between these cutter blades a holder for another cutter blade is supported on the cutter body. This latter cutter blade and the triangular shaped blades are aligned along with the rectangular shaped cutter blades so as to machine a plural surface profile on a work piece.

38 Claims, 4 Drawing Figures

2
3
12
14
22
24
26
28
30
32
33
50
10
20
72
74
78
80
82
84
86
90
95
96
97
98
100
102
104
106
108
110
112
114
116
118
120
122

CUTTING TOOL ASSEMBLY

Matter enclosed in heavy brackets [ ] appears in the original patent but forms no part of this reissue specification; matter printed in italics indicates the additions made by reissue.

This invention relates to an improved cutting tool assembly.

The machining of certain types of work pieces with a profile that requires compound surfaces be turned; e.g., the crankpins of a vehicle engine crankshaft, presents several considerations including tool life, accuracy, the time required and the cost of the equipment. With the crankpin as an example, to achieve accuracy with the acceptable tool life, a two step machining operation is required; i.e., a rough machining step followed by a finish machining step. Therefore both additional equipment and time are needed to meet present mass production requirements. One of the reasons for this two step operation is the lack of an acceptable cutting tool. Single cutter blades with several different cutting edges have not been acceptable because if one cutting edge is damaged, the entire cutting blade has to be replaced or an expensive regrinding process is required.

With the foregoing in mind, a new and different cutting tool assembly is contemplated that enables compound surfaces to be formed accurately on a work piece by a single step operation.

Further contemplated is a cutting tool assembly that is durable, easily serviced and that can accurately and efficiently form plural surfaces on a workpiece with a plurality of cutter blades.

Also contemplated is a cutting tool assembly that utilizes a plurality of cutter blades uniquely mounted so as to provide desired cutting angles and also the proper overlap to accurately turn compound diameter and shoulder surfaces on a work piece.

Other objects include the provision of a cutting tool assembly that in a novel way maintains a plurality of cutter blades in place on a cutter body so as to achieve enhanced tool life, accuracy and operational efficiency and that can be used by present mass production equipment to machine plural surface profiles.

The foregoing and other objects and advantages of the invention will become apparent from the following description and from the accompanying drawings, in which.

Figure 1:
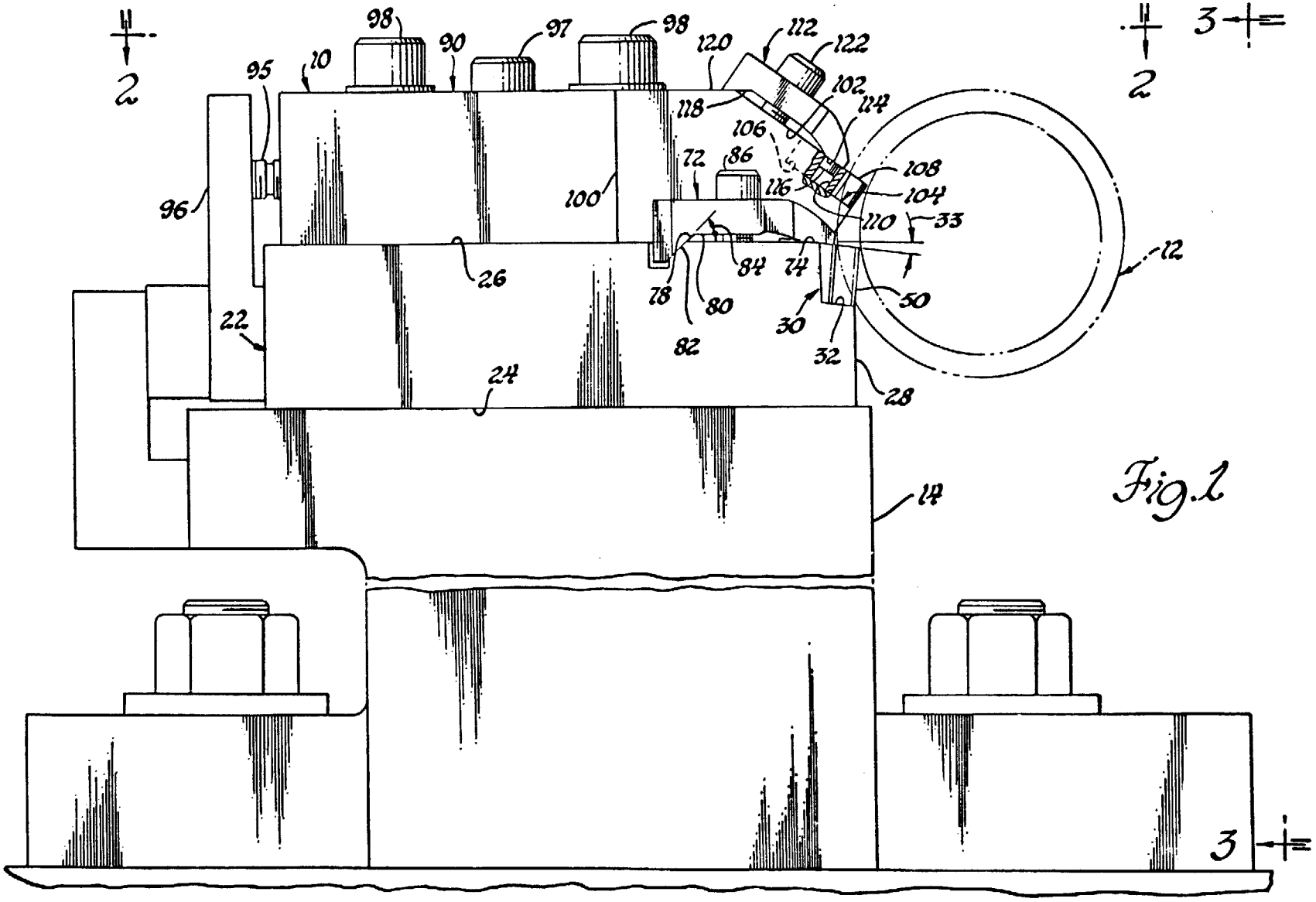
FIG. 1 is a side elevational view of a cutting tool assembly incorporating the principles of the invention.

Referring first to FIG. 1, the numeral 10 denotes generally a cutting tool assembly that is adapted for positioning relative to a rotatable workpiece, such as a crankshaft 12. The cutting tool assembly 10 is adjustably mounted upon a block 14, which in a well known way can move the cutting tool assembly 10 into and out of the cutting relationship with the crankshaft 12.

Figure 2:
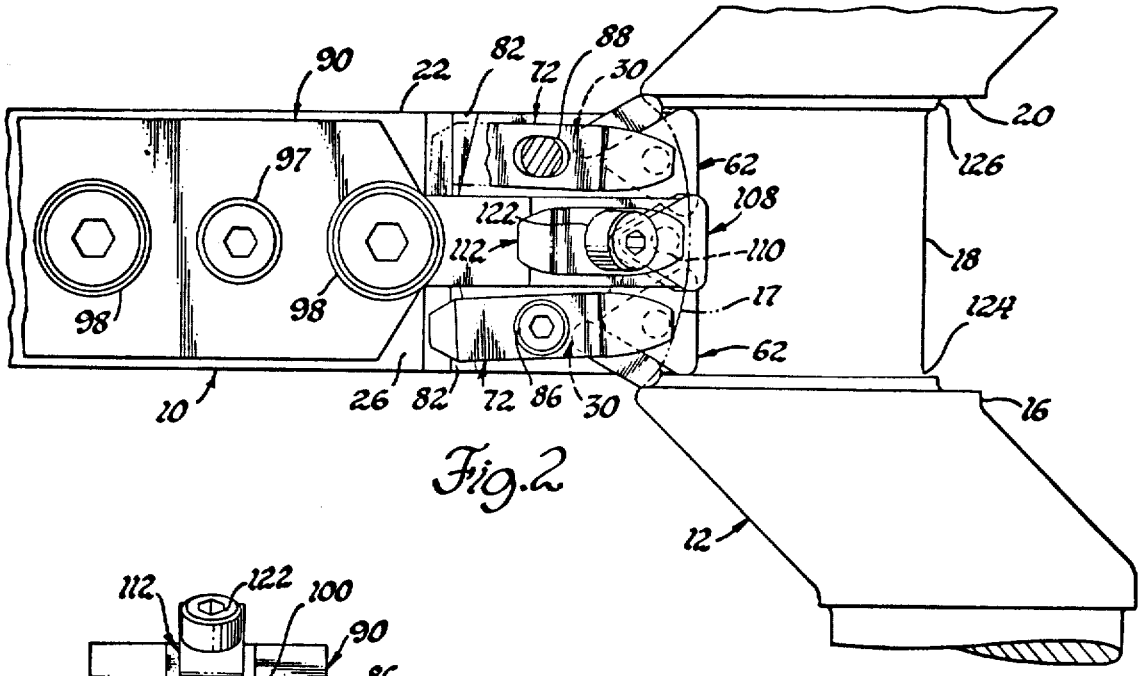
FIG. 2 is a top elevational view, looking in the direction of arrows 2—2 in FIG. 1, of the cutting tool assembly shown positioned for machining a vehicle crankshaft.

For example, the block 14 may be a part of a conventional feed mechanism (not shown) for some kind of a production line transfer machine or a lathe. For purposes of demonstration and without limitation, the crankshaft 12 is in the form of a forging and has, as seen in FIG. 2, a crankpin portion 16 which when unmachined, has the shape shown by the dashed line at 17. When machined by the cutting tool assembly 10, the crankpin portion 16 will have the depicted profile including a crankpin surface 18 and a shoulder clearance surface 20, each being machined to a different dimension and in one step as will become apparent.

The cutting tool assembly 10 has a cutter body 22 with a bottom V-shaped mounting surface 24, which is seated on the block 14, and a top surface 26. The body 22 also has at its cutting end 28 a cutter blade mounting provision in the form of a pair of substantially V-shaped slots 30.

Figure 3:
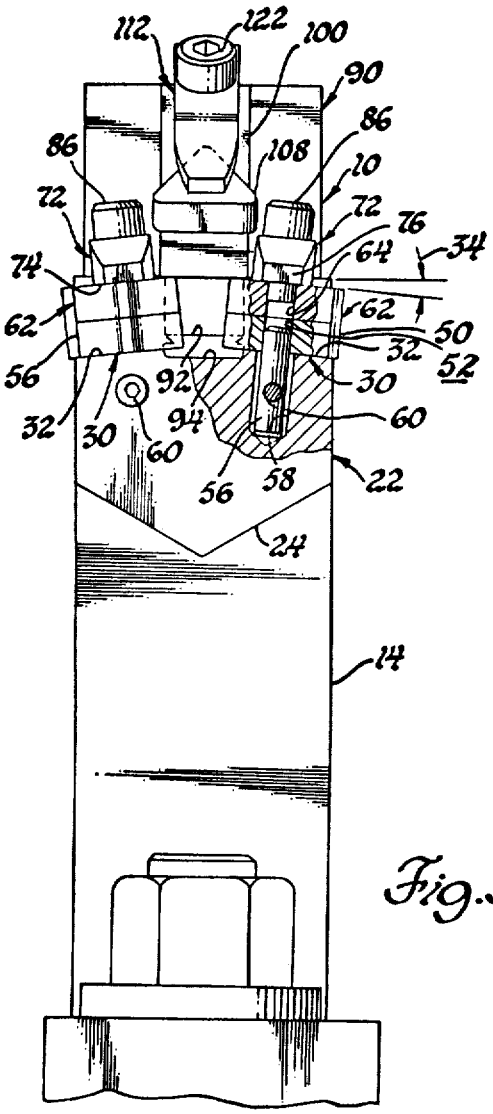
FIG. 3 is a front elevational view of the cutting tool assembly looking in the direction of arrows 3—3 in FIG. 1.
Figure 4:
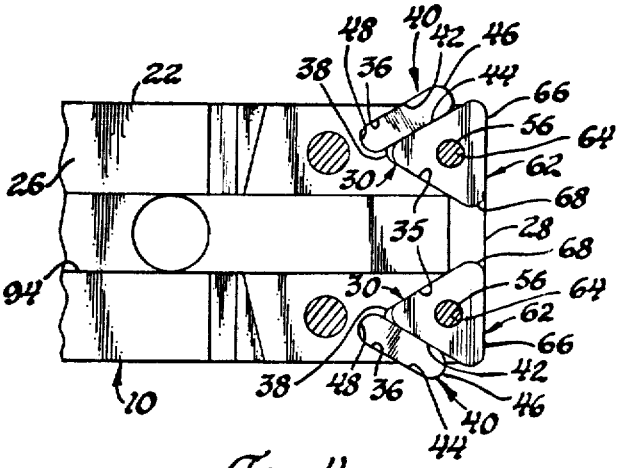
FIG. 4 is a fragmentary enlarged view with parts removed of a portion of the cutting tool assembly as viewed in FIG. 2.

Each of the V-shaped slots 30 has a seating surface 32, which is inclined forwardly at an angle 33, as viewed in FIG. 1, and outwardly at an angle 34, as seen in FIG. 3. Each V-shaped slot 30 also has extending transversely from the seating surface 32 as depicted in FIG. 4, an inside locating surface 35, an outside locating surface 36, and a rear surface 38. In this embodiment each of these surfaces are either perpendicular to the seating surface 32 or tapered towards the seating surface to facilitate cutter blade retention.

Positioned in each of the slots 30 is a rectangular shaped side cutter blade 40 formed of a suitably hard machining metal, such as tungsten carbide, and preferably made to extremely close tolerances. With each blade 40 substantially identical in shape and dimension, they can be discarded when damaged and replaced with a new blade. Each of the cutter blades 40 has opposite parallel sides 42 and 44 and rounded cutting edges 46. These edges 46 can have other than the depicted rounded contour. The side cutter blades 40 when in place in the slots 30 engage the outside locating surface 36 and the rear surface 38, which has a contour at 48 that conforms to the rounded cutting edges 46, but can have other shapes. When in the operative position, the side cutting blades 40 each extend beyond the side of the cutter body 22, as viewed in FIGS. 2 and 4.

Also for mounting purposes, a cutter blade support provision is included in each slot 30 in the form of a cutter blade support member 50 that has the depicted triangular configuration. When the support members 50 are in position each engages the parallel side 44 of the associated side cutter blade 40 and also the inside locating surface 34 of the slot 30. Thus, the support members 50 function somewhat as a wedge for maintaining the side cutter blades 40 in their operative positions. The cutter blade support members 50 each have a through center opening 52 for purposes to be explained.

A locking provision is provided for maintaining each of the cutter blade support members 50 in place. This provision includes, as illustrated in FIG. 3, a dowel pin 56 or the like that is received in a blind hole 58 in the cutter body 22 and extends from the hole 58 upwardly and into the center opening 52 in the associated cutter blade support member 50. The dowel pin 56 has a relatively loose fit in the hole 58 but a relatively good sliding fit in the support member opening 52. To complete the locking provision, set screws 60 are threadedly carried by the cutter body 22 at point near the lower end of each of the dowel pins 56 and when tightened force the dowel pin 56 rearwardly and, accordingly, each of the cutter blade support members 50 so as to form a wedged relationship with the slots 30 and the side cutter blades 40.

Positioned on each of the cutter blade supporting members 50 is an indexable front cutter blade 62 of a relatively thin triangular shape. The front cutter blades 62 are of the throw-away type being also formed of hard cutting material, such as tungsten carbide, and manufactured to extremely close tolerances. The front cutter blades 62 have a center opening 64 and relatively straight cutting edges 66 and end cutting edges 68 on all sides. When in the depicted FIG. 3 operative position each of the front cutter blades 62 engages the side 44 of the side cutter blade 40 and the inside locating surface 35 of the slot 30 has the proper radial alignment with the crankshaft 12.

If preferred the cutter blade support members 50 can be the same as the front cutter blades 62 and thus, would provide an auxiliary cutter blade in event replacement of one of the front blades 62 was required because of damage. It is also possible to use a damaged front cutter blade 62 in place of the support member 50.

For holding the front cutter blades 62 in the operative position within the slots 30, clamp elements 72 are provided. Each of these clamp elements 72, as best observed in FIG. 1, has a cutter blade engaging surface 74 with a depending pin 76 (FIG. 3), and rear inclined surface 78 and an intermediate relieved portion 80. The depending pin 76 of each clamp element 72 fits within the center opening 64 in a respective one of the front cutter blades 62, whereas the rear inclined surface 78 engages one of a pair of inclined or tapered surfaces 82 on the cutter body 22. Each of the cutter body inclined surfaces 82 is formed with a compound angle that has the same angle of inclination outwardly as the seating surface angle 34 (see FIG. 3) and an angle of forward inclination, as shown at 84 in FIG. 1. The angle 84 has a total angular extent equal to the sum of a predetermined angular amount and the forward inclination of the seating surface angle 33. Each of the clamp element inclined surfaces 78 has a complimentary inclination so as to have a substantial area thereof in engagement with the inclined surface 82 on the cutter body 22. Also, the clamp element cutter blade engaging surfaces 74 have a relatively large area thereof in engagement with the face of the respective one of the front cutter blades 62 to facilitate maintenance of the blades 62 in the operative position. The FIG. 1 clamping position for each clamp element 72 is maintained by a suitable holding screw 86 which extends through an elongated opening 88 (FIG. 2) in the clamp element 72 and threadedly engages the cutter body 22. The holding screw 86 is threaded into the cutter body 22 at an angle with the same outward inclination as the seating surfaces 32 have in FIG. 3 at the angle 34.

Referring again to FIG. 1, the angle 84 of the inclined surface 82 is selected so that when the holding screw 86 is tightened, the resolutions of forces will be such that the cutter blade 62 is forced rearwardly and in the plane of the seating surface 32, thus facilitating the wedging relationship for holding both the front cutter blade 62 and the side cutter blade 40 in their operative positions. If the angle 84 of this inclined surface 82 is too steep; for example, perpendicular to the top surface 26 of the cutter body 22, the clamp element 72, when forced into the clamping position by the tightening of the holding screw 86 would tend to raise the cutter blade 62 from its viewed position in FIG. 1. Contrariwise, if the angle 84 of the inclined surface 82 is not steep enough, there will not be an adequate force imposed upon the cutter blade 62 to maintain it in its operative position. By way of example and without limitation, it has been determined that if the inclination of the seating surface angle 33 is 5°, then the angle at 84 should be 30° plus the 5° or 35°.

Completing the assembly is a holder 90 which is slidably positioned on the top surface 26 of the cutter body 22. The holder 90 has extending the length thereof a depending center portion 92 (FIG. 3), which engages a complimentary slot 94 in the top surface 26 of the cutter body 22 so as to provide sliding adjusting movement only in the direction towards and away from the workpiece. This sliding adjusting movement can be made by a differential screw 95, which threadedly engages both the holder 90 and a bracket 96 suitably attached to the cutter body 22. The holder 90 is releasably maintained on the cutter body 22 by one or more screws 97, which threadedly engage the cutter body 22. The holder 90 and the cutter body 22 are both releasably fixed on the block 14 by a pair of elongated screws 98 that threadedly engage the block 14.

As viewed in FIG. 2, the holder 90 has a narrow front portion 100 that extends between the two clamp elements 72. This narrow portion 100 has an upper inclined surface 102 and at the end thereof a cutter blade receiving slot 104 which can also be triangular shaped. This slot 104 has a seating surface 106 (FIG. 1) on which is mounted a triangular shaped middle cutter blade 108 including a center opening 110. The blade 108 can be of the indexable throw-away type and thus similar to the front cutter blades 62 and is appropriately inclined by the seating surface 106 so that the proper cutting angles are provided and also so as to be in the required approximate radial alignment with the center of the crankpin portion 16.

For holding the middle cutter blade 108 in the operative position, a clamp element 112 is employed that is similar structurally and functionally to the clamp elements 72. This clamp element 112 has a cutter blade engaging surface 114 provided with a depending pin 116 and a rear inclined surface 118. When in the FIG. 1 clamping position, the depending pin 116 engages the center opening 110 in the middle cutter blade 108, the surface 114 is flush against the face of the blade 108, and the rear inclined surface 118 engages a top portion 120 of the holder 90. As with the clamp elements 72, the angular relationship is such as to provide the proper restraining forces for urging the middle cutter blade 108 rearwardly in the plane of its seating surface 106. A suitable screw 122 holds the clamp element 112 in the depicted position.

As viewed in FIGS. 1 and 2, the alignment of the front cutter blades 62 and the middle cutter blades 108 respectively on the cutter body 22 and the holder 90 takes into consideration the different plane location of the middle cutter blade 108 and is such that an uninterrupted diametrical cut is made on the crankpin surface 18. Also, the blade sizes are selected to provide the FIG. 2 illustrated crankpin profile. As the cutting tool assembly 10 is fed into the crankpin portion 16, it will be noted that the side cutter blades 40 and the front cutter blades 62 have substantially more metal to remove than the middle cutter blade 108. This the described cutting tool assembly 10 can accompllish accurately in one step and without sacrificing durability. Also, it will be noted that the end cutting edges 68 of the front cutter blades 62 provide the crankpin surface 18 with the proper size fillet at 124 and that the side cutter blades 40 provide the shoulder clearance surfaces 20, which terminate in a larger diameter at a fillet 126. This surface 20 and fillet 126 provide somewhat of a boss for facilitating the installation and positioning of the vehicle crank in the crankpin portion 16.

The single machining step is done with indexable throw-away cutter blades that can be replaced in a minimum amount of time without concern about realignment. Furthermore, when the support members 50 are the same as the cutter blades 62 they can serve as auxiliary blades and be used to replace one of the damaged front cutter blades 62. The resolution of the forces with respect to the clamp elements 72 and the clamp element 112 provide *optimum* holding forces that maintain the wedge like relationship so that the cutting blades 62 and 40 cannot shift or move so as to be damaged or damage the crankshaft 12 during the machining operation.

What is claimed is:

1. A cutting tool assembly comprising a cutter body including a mounting surface and a cutting end having cutter blade mounting means on opposite sides thereof, each mounting means including a slot opening outwardly from the cutting end and being so arranged as to have a certain angular relationship with the mounting surface for establishing desired cutting angles; the cutter body also including a pair of inclined surfaces each displaced from a respective one of the pair of slots and being provided with an inclination having a predetermined relationship with the certain angular relationship of each of the pair of slots; a pair of side cutter blades respectively positioned within the slots so that in the operative position thereof the cutting edges thereof project from the side of the cutter body; a pair of front cutter blades respectively positioned within the slots so that in the operative position thereof each front cutter blade is in a certain cutting alignment relative to the other and a respective one of the side cutter blades and is also arranged so as to be in engagement with a respective one of the pair of side cutter blades; and a pair of clamp elements respectively adjustably positioned on the cutter body adjacent the pair of front cutter blades so as to have a predetermined angular relationship with a respective one of the pairs of slots, each clamp element in the clamping position thereof having an inclined surface in engagement with a respective one of the pair of inclined surfaces on the cutter body and a cutter blade engaging portion in engagement with a respective one of the pair of front cutter blades so as to maintain a respective one of the pair of front cutter blades and a respective one of the pair of side cutter blades in the operative positions thereof for cutting a certain profile.

2. A cutting tool assembly as described in claim 1, further including a holder removably positioned on the cutter body and having a cutter blade mounted thereon so as to be in the operative position thereof and in cutting alignment with each of the pair of front cutter blades.

3. A cutting tool assembly as described in claim 2, further including a clamp element releasably positioned on the holder and having a front portion engageable with the holder mounted cutter *blade* and a rear portion provided with an incliñed surface engageable with the holder at a certain angle so as to maintain the holder mounted cutter blade in the operative position thereof.

4. A cutting tool assembly as described in claim 1, wherein each of the pair of slots are defined by a seating surface having a certain angular relationship with the mounting surface for establishing the desired cutting angles and inside and outside locating surfaces extending laterally from the seating surface and at a predetermined angle relative thereto, each of the pair of side cutter blades is positioned within a respective one of the pair of slots and in engagement with both the seating surface and the outside surface and each of the pair of forward cutter blades is positioned within a respective one of the slots so as to be in engagement with both the inside locating surface and a respective one of the pair of the side cutter blades.

5. A cutting tool assembly as described in claim 4, wherein the mounting means further includes a pair of support members respectively positioned within the pair of slots and in engagement with the seating surface and a respective one of the pair of front cutter blades and a respective one of the pair of side cutter blades.

6. A cutting tool assembly as described in claim 4, wherein the slots are each triangular shaped and each of the pair of front cutter blades are indexable and also triangular shaped and have a central opening therein engageable with the cutter blade engaging portion of a respective one of the pair of clamp elements.

7. A cutting tool assembly as described in claim 1, wherein the mounting means includes a pair of auxiliary cutter blades respectively positioned within a respective one of the pair of slots on the seating surface thereof and in the operative position thereof in engagement both with a respective one of the pair of side cutter blades and the outside locating surface, each auxiliary cutter blade having a triangular shape and having a central opening therein; the mounting means also including means locking each of the pair of auxiliary cutter blades in the operative position thereof; each of the pair of slots being triangular shaped and defined by a seating surface having a certain angular relationship with the cutter body mounting surface for establishing desired cutting angles and inside and outside locating surfaces each extending laterally from the seating surface and at a predetermined angle relative thereto; each of the pair of front cutter blades being indexable and interchangeable with the auxiliary cutter blades, each of the pair of front cutter blades also *being* triangular shaped and having a central opening therein engageable with the cutter blade engaging portion of a respective one of the pair of the clamp elements.

8. A cutting tool assembly as described in claim 7, wherein the locking means includes a pair of pin elements extendable from the cutter body and into the central opening in a respective one of the pair of auxiliary cutter blades and screw means carried by the cutter body for locking each pin element into the locking position and accordingly a respective one of the pair of auxiliary cutter blades in the operative position thereof.

9. A cutting tool assembly as described in claim 8, further including a holder removably positioned in the cutter body and having a cutter blade mounted thereon so as to be in the operative position thereof and in cutting alignment with each of the pair of front cutter blades and a clamp element releasably positioned on the holder and having a front portion engageable with he holder mounted cutter blade and a rear portion provided with an inclined surface engageable with the holder at a certain angle so as to maintain the holder mounted cutter blade in the operative position thereof.

10. A cutting tool assembly comprising a cutter body having a mounting surface, a cutting end and a pair of spaced apart triangular shaped slots opening outwardly from the cutting end, each of the pair of slots being defined by a seating surface having a certain forward inclination and a certain lateral inclination both relative to the mounting surface for establishing desired cutting angles and inside and outside locating surfaces perpendicular with and extending from the seating surface; the cutter body also including a pair of inclined surfaces each displaced from a respective one of the pair of slots and being provided with an inclination having a certain relationship to the inclinations of the seating surface; a pair of rectangular shaped side cutter blades respectively positioned within the slots and in engagement with both the seating surface and the outside surface of a respective one of the pair of slots so that in the operative position thereof the cutting edges thereof project from the side of the cutter body; a pair of triangular shaped auxiliary cutter blades respectively positioned within the pair of slots, each of the pair of auxiliary cutter blades having a central opening and being positioned on the seating surface of a respective one of the pair of slots and in engagement with both a respective one of the pair of side cutter blades and the respective inside locating surface; a pair of triangular shaped front cutter blades respectively positioned within the slots and having a central opening, each of the pair of front cutter blades being positioned on a respective one of the pair of auxiliary cutter blades and in engagement with both the inside locating surface of a respective one of the pair of slots and a respective one of the pair of side cutter blades and aligned in the operative position thereof so that the cutting edges thereof are in cutting alignment with each other; the pair of auxiliary cutter blades and the pair of front cutter blades being interchangeable with each other; a pair of clamp elements respectively adjustably positioned on the cutter body adjacent the pair of front cutter blades so as to have an inclination relative to the cutter body mounting surface corresponding to the certain lateral inclination of the seating surfaces of the pair of slots, each clamp element in the clamping position thereof having an inclined surface engageable with a respective one of the pair of inclined surfaces on the cutter body and a cutter blade engaging portion in engagement with a respective one of the pair of front cutter blades and also in engagement with the central opening in a respective one of the pair of front cutter blades so as to maintain a respective one of the front cutter blades and a respective one of the side cutter blades in the operative position thereof; locking means for each of the pair of auxiliary cutter blades; the locking means including a pair of pin elements carried by the cutter body and respectively extending into the central opening in the pair of auxiliary cutter blades and screw means for locking the pair of pin elements in place so as to maintain a respective one of the auxiliary blade cutters and a respective one of the side cutter blades in the operative positions thereof; and a holder adjustably positioned on the cutter body and having an end portion thereof extending between the pair of front cutter blades, the end portions having a middle cutter blade mounted thereon so as to be in the operation position thereof and in cutting alignment with each of the pair of front cutter blades at a predetermined cutting angle so as to cooperate with the pair of side cutter blades for developing a machining profile including an elongated diameter portion and a shoulder portion laterally extending from the diameter portion, and a clamp element releasably positioned on the holder and having a front portion engageable with the holder mounted cutter blade and a rear portion provided with an inclined surface engageable with the holder at a certain angle so as to maintain the holder mounted blade in the operative position thereof.

*11. A cutting tool assembly of the type that is fed in one direction into a workpiece during a machining operation to provide on the workpiece when the machining operation is completed a profile composed of at least two distinct surfaces, comprising: a cutter body having sides and a cutting end having cutter blade mounting means on opposite sides of said cutting end, each mounting means including a slot opening outwardly from the cutting end, a pair of removable side cutter blades positioned within the respective slots so that in the operative position thereof the cutting edges thereof project from the side of said cutter body, a pair of removable front cutter blades positioned within the respective slots so that in the operative position thereof a cutting edge of each front cutter blade is in a certain cutting alignment relative to the other front cutter blade and to a cutting edge of a respective one of the side cutter blades such that said front and side cutter blades will remove material from a workpiece in machining thereon a profile composed of at least two surfaces with said front cutter blades machining at least one surface distinct from the surfaces machined by said side cutter blades, each cutter blade having sidewalls extending generally rearwardly of its cutting edge, said side and front cutter blades in each slot being juxtaposed, at least one cutter blade in each slot having a pair of sidewalls converging generally rearwardly away from the outward opening of its associated slot and rearwardly from its cutting edge in a direction generally opposite to the direction in which its cutting edge is fed into a workpiece with one of said converging sidewalls being juxtaposed with and bearing on a sidewall of the other cutter blade in said associated slot to wedge both the cutter blades in said associated slot, and means retaining each of said one cutter blades in their respective slots so as to maintain a respective one of the pair of front cutter blades and a respective one of the pair of side cutter blades in their respective slots in the operative positions thereof for cutting a certain profile.*

*12. A cutting tool assembly as described in claim 11 further comprising a holder removably positioned on the cutter body and having a cutter blade mounted thereon so as to be in the operative position thereof and in cutting alignment with each of the pair of front cutter blades.*

*13. A cutting tool assembly as described in claim 11 wherein each of the pair of slots are defined by a seating surface and inside and outside locating surfaces extending laterally from the seating surface and at a predetermined angle relative thereto, each of the pair of side cutter blades is positioned within a respective one of the pair of slots and in engagement with both the seating surface and the outside surface and each of the pair of forward cutter blades is positioned within a respective one of the slots so as to be in engagement with both the inside locating surface and a respective one of the pair of the side cutter blades.*

*14. A cutting tool assembly as described in claim 13 wherein the mounting means further includes a pair of support members respectively positioned within the pair of slots and in engagement with the seating surface and a respective one of the pair of front cutter blades and a respective one of the pair of side cutter blades.*

*15. A cutting tool assembly as described in claim 13 wherein the slots are each triangular shaped and each of the pair of front cutter blades are indexable and also triangular shaped and have a central opening therein engageable with a cutter blade engaging portion of the retaining means.*

*16. A cutting tool assembly as described in claim 11 wherein each of the pair of slots is triangular shaped and defined by a seating surface and inside and outside locating surfaces each extending generally transversely from the seating surface, the mounting means includes a pair of auxiliary cutter blades respectively positioned within a respective one of the pair of slots on the seating surface thereof and in engagement both with a respective one of the pair of side cutter blades and the inside locating surface, each auxiliary cutter blade having a triangular shape and having a central opening therein, the mounting means also including means locking each of the pair of auxiliary cutter blades in the operative position thereof, each of the pair of front cutter blades being indexable and interchangeable with the auxiliary cutter blades, and each of the pair of front cutter blades also being triangular shaped and having a central opening therein engagable with a cutter blade engaging portion of the retaining means.*

*17. A cutting tool assembly as described in claim 16 wherein the locking means includes a pair of pin elements extendable from the cutter body and into the central opening in a respective one of the pair of auxiliary cutter blades and screw means carried by the cutter body for locking each pin element into the locking position and accordingly a respective one of the pair of auxiliary cutter blades in the operative position thereof.*

*18. A cutting tool assembly of the type that is fed in one direction into a workpiece during a single step machining operation to provide on the workpiece when the single step machining operation is completed at least two distinct surfaces, comprising: a cutter body having at least one cutter blade mounting slot opening outwardly from said cutter body, said mounting slot having at least two sidewalls at least in part spaced from each other and converging generally rearwardly from the outward opening of said slot in a direction generally opposite to said one direction in which said cutter body is fed into a workpiece, first and second cutter blades each having a cutting edge thereon and sidewalls extending generally rearwardly of said cutting edge, said first and said second cutter blades being removably juxtaposed in said slot between the sidewalls thereof with said cutting edges displaced from each other to each produce in said single step machining operation a respective one of said two distinct surfaces, at least one of the cutter blades having a pair of sidewalls converging generally rearwardly from said outward opening of said mounting slot and rearwardly from its cutting edge in a direction generally opposite to said one direction with one of said converging sidewalls being juxtaposed with and bearing on a sidewall of the other cutter blade to wedge both said cutter blades between said two sidewalls of said mounting slot, and means retaining said one cutter blade in said mounting slot in engagement with said other cutter blade whereby both the cutter blades are retained on said cutter body by a wedging action of said one cutter blade.*

*19. A cutting tool assembly as described in claim 18 wherein said mounting slot is generally triangular shaped and one of the cutter blades received therein is indexable and also generally triangular shaped.*

*20. A cutting tool assembly as described in claim 18 further comprising a cutter blade support member adapted to underlie said one cutter blade and having generally rearwardly converging surfaces thereof bearing on an associated sidewall of said mounting slot and the other cutter blade, and another means retaining said support member in said mounting slot to wedge the other cutter blade and said support member between said two sidewalls of said mounting slot, whereby the other cutter blade is firmly retained on said cutter body.*

*21. A cutting tool assembly as described in claim 18 wherein said mounting slot has a seating surface therein extending generally transverse of said sidewalls thereof with said seating surface underlying and supporting the cutter blades.*

*22. A cutting tool assembly as described in claim 18 wherein the other converging sidewall of said one cutter blade is juxtaposed with and bears on one of said converging sidewalls of said mounting slot and the other sidewall of said other cutter blade is juxtaposed with and bears on the other of said converging sidewalls of said mounting slot.*

*23. A cutting tool assembly as described in claim 18 wherein said cutter body has a cutter end and at least one side face generally transverse thereto, said mounting slot receives the first cutter blade therein with the cutting edge thereof projecting from said side face of said cutter body, and said mounting slot also receives the second cutter blade therein with the cutting edge thereof adjacent the cutter end of said cutter body in a predetermined alignment relative to the cutting edge of the first cutter blade such that the cutter blades machine surfaces in a workpiece generally transverse to each other.*

*24. A cutting tool assembly as described in claim 23 wherein said mounting slot has a seating surface therein extending generally transverse of said sidewalls thereof with said seating surface underlying and supporting the cutter blades.*

*25. A cutting tool assembly as described in claim 24 wherein said retaining means also urges at least one of the cutter blades into firm engagement with said seating surface in said mounting slot.*

*26. A cutting tool assembly as described in claim 23 further comprising a cutter blade support member adapted to underlie said one cutter blade and having generally rearwardly converging surfaces thereof bearing on an associated sidewall of said mounting slot and the othe cutter blade, and another means retaining said support member in said mounting slot to wedge the other cutter blade and said support member between said two generally opposed sidewalls of said mounting slot, whereby the other cutter blade is firmly retained on said cutter body.*

*27. A cutting tool assembly as described in claim 26 wherein said mounting slot has a seating surface therein extending generally transverse of said sidewalls thereof with said seating surface underlying and supporting the cutter blades, and said support member is interposed between said one cutter blade and said seating surface.*

*28. A cutting tool assembly as described in claim 27 wherein said first-mentioned retainer means also urges at least said one cutter blade toward said seating surface in*

*said mounting slot and urges said support member into firm engagement with said seating surface in said mounting slot.*

*29. A cutting tool assembly of the type that is fed in one direction into a workpiece during a machining operation to provide on the workpiece when the machining operation is completed at least two distinct surfaces, comprising: a cutter body having at least one cutter blade mounting means opening outwardly from said cutter body, said mounting means having at least two locating surfaces at least in part spaced from each other with at least one of said locating surfaces extending in a direction generally away from the outward opening of said mounting means, first and second cutter blades each having a cutting edge thereon and sidewalls extending generally rearwardly of said cutting edge, said cutter blades being removably juxtaposed in said mounting means between said locating surfaces thereof with said cutting edges displaced from each other to each produce in said machining operation a respective one of said two distinct surfaces, means for urging said first cutter blade in a direction generally away from said opening of said mounting means and generally opposite to said one direction, each of said cutter blades having a respective pair of said sidewalls disposed between said locating surfaces of said mounting means and wherein said pair of sidewalls of said first cutter blade converge relative to each other in a direction away generally rearwardly from the outward opening of said mounting means and generally rearwardly from its cutting edge in a direction generally opposite to said one direction, with one of said converging sidewalls being juxtaposed with and bearing on one of the sidewalls of the other cutter blade so that urging of said one cutter blade in a direction generally rearwardly from said opening of said mounting means and generally opposite to said one direction wedges both cutter blades against said locating surfaces of said mounting means to firmly retain said cutter blades on said cutter body.*

*30. A cutting tool assembly as described in claim 29 wherein said locating surfaces of said mounting means converge in a direction generally rearwardly from said opening of said mounting means and generally opposite to said one direction.*

*31. A cutting tool assembly as defined in claim 30 wherein said pair of sidewalls of said other cutter blade are parallel to each other.*

*32. A cutting tool assembly of the type that is fed in one direction into a workpiece during a single step machining operation to provide on the workpiece when the single step machining operation is completed at least two distinct surfaces, comprising: a cutter body, first and second locating means on said cutter body spaced apart from each other, first and second cutter blades removably carried on said cutter body, each of said cutter blades having a cutting edge thereon with said cutting edges being displaced from each other to each produce in said single step machining operation a respective one of said two distinct surfaces, each of said cutter blades having a pair of walls extending generally rearwardly of its cutting edge, the walls of said first cutter blade converging relative to each other in a direction generally rearwardly from the cutting edge of said first cutter blade and generally opposite to said one direction, said first and second cutter blades being juxtaposed and wedged into engagement with each other and said locating means with one of said converging walls of said first cutter blade bearing on one of said locating means, the other of said converging walls of said first cutter blade being juxtaposed with and bearing on one of said walls of said second cutter blade and the other wall of said second cutter blade bearing on the other locating means, and means for retaining said first cutter blade in engagement with said one locating means and said one wall of said second cutter blade so that both cutter blades are retained on said cutter body by a wedging action of said first cutter blade.*

*33. A cutting tool assembly as described in claim 32 wherein said first and second cutter blades are arranged and disposed relative to each other and to said locating means so that said first and second cutter blades are wedged into engagement with each other and said locating means by a force on the first cutter blade having a component generally transverse to said cutting edge of said first cutter blade.*

*34. A cutting tool assembly as described in claim 32 wherein said cutter body includes a slot opening outwardly from said cutter body, said slot having at least two sidewalls at least in part spaced from each other and extending in a direction generally rearwardly from the outward opening of said slot and generally opposite to said one direction, said sidewalls of said slot forming said first and second locating means, and wherein said first and second cutter blades are arranged and disposed relative to each other and to said sidewalls of said slot so that said first and second cutter blades are wedged into engagement with each other and said sidewalls of said slot by a force on said first cutter blade having a component in a direction inwardly of said outward opening of said slot and generally opposite to said one direction.*

*35. A cutting tool assembly as described in claim 34 wherein said sidewalls of said slot converge relative to each other in a direction generally rearwardly from said outward opening of said slot and generally opposite to said one direction.*

*36. A cutting tool assembly as described in claim 32 wherein said first cutter blade is arranged on said cutter body to be fed in a first direction into a workpiece during a machining operation and wherein said first and second cutter blades are arranged and disposed relative to each other and to said locating means so that said first and second cutter blades are wedged into engagement with each other and said locating means by a force on said first cutter blade having a component in a direction generally opposite to the direction in which said first cutter blade is fed into said workpiece.*

*37. A cutting tool assembly as described in claim 32 wherein said first cutter blade is arranged on said cutter body to be fed in a first direction into a workpiece during a machining operation and wherein said other converging wall of said first cutter blade is disposed at an acute included angle to said first direction.*

*38. A cutting tool assembly as described in claim 32 wherein said cutter body has mounting means thereon opening in a direction outwardly of said cutter body, said mounting means including said locating means, said locating means being disposed on said cutter body inwardly of said outward opening of said mounting means and wherein said first and second cutter blades are arranged and disposed relative to each other and to said locating means so that said first and second cutter blades are wedged into engagement with each other and said locating means by a force on said first cutter blade having a component in a direction inwardly of said opening of said mounting means and generally opposite to said one direction.*

* * * * *